United States Patent [19]

Yongning et al.

[11] Patent Number: 4,755,700
[45] Date of Patent: Jul. 5, 1988

[54] VARIABLE SPEED AC MOTOR

[76] Inventors: Tian Yongning; Tao Fengbai, both of 106 Men 3, Building 4, Putaoyuan Zhanlan Road, Beijing, China

[21] Appl. No.: 120,168

[22] Filed: Nov. 13, 1987

Related U.S. Application Data

[63] Continuation of Ser. No. 846,203, Mar. 31, 1986, abandoned.

[30] Foreign Application Priority Data

Apr. 1, 1985 [CN] China ................. 85100607

[51] Int. Cl.⁴ ...................... H02K 16/00; H02K 23/60
[52] U.S. Cl. .................... 310/114; 310/115; 310/122; 318/49; 318/730
[58] Field of Search ............... 310/114, 115, 118, 124, 310/126, 49; 318/42, 44, 45, 49, 730, 769

[56] References Cited

U.S. PATENT DOCUMENTS

| | | | |
|---|---|---|---|
| 841,874 | 1/1907 | De Kando | 318/49 X |
| 912,144 | 2/1909 | Mavor | 318/730 |
| 1,480,710 | 1/1924 | Fortescue | 318/769 X |
| 1,480,723 | 1/1924 | Hellmund | 318/49 |
| 1,983,896 | 12/1934 | Böttcher | 318/730 |
| 2,061,983 | 11/1936 | Rossman | 310/122 X |
| 2,087,782 | 7/1937 | Rossman | 318/44 |
| 3,026,459 | 3/1962 | Moore | 310/115 |
| 3,168,665 | 2/1965 | Holper | 310/118 X |
| 3,939,370 | 2/1976 | Müller | 310/125 |

FOREIGN PATENT DOCUMENTS

| | | |
|---|---|---|
| 224271 | 10/1909 | Fed. Rep. of Germany . |
| 696050 | 9/1940 | Fed. Rep. of Germany . |
| 826769 | 1/1952 | Fed. Rep. of Germany . |
| 2000400 | 7/1971 | Fed. Rep. of Germany . |
| 573884 | 7/1924 | France . |

*Primary Examiner*—Mark O. Budd
*Attorney, Agent, or Firm*—Oblon, Fisher, Spivak, McClelland & Maier

[57] ABSTRACT

In a first type of variable speed electric motor, two coaxial shafts are mounted in a housing. Two rotors are mounted on each shaft. Two stators are mounted in the housing. Each of the stators is in operative association with a rotor mounted on a different one of the shafts. The remaining two rotors are in operative association with each other and form a converter motor. In the second type of variable speed electric motor, two parallel shafts are mounted in a housing. A support is mounted for rotation around the first shaft. Two rotors are mounted on the first shaft. A stator is mounted in the housing in operative association with one of the rotors mounted on the first shaft. A third rotor is mounted on the support in operative association with the other rotor mounted on the first shaft. The support is geared to the first shaft through idler gears mounted on the second shaft.

1 Claim, 1 Drawing Sheet

VARIABLE SPEED AC MOTOR

This application is a continuation of application Ser. No. 846,203, filed on Mar. 31, 1986, now abandoned.

FIELD OF THE INVENTION

This invention relates to a variable speed AC motor and a method of operating the variable speed AC motor.

BACKGROUND OF THE INVENTION

A conventional slip motor comprises a rotor having windings therearound. Induced potential in the windings is directed to the load through an electric brush and a slip ring. By varying the impedance in the circuit of the rotor, overcurrent in the windings of the rotor can be prevented, thereby preventing the motor from being damaged at low speeds. However, this means that the efficiency of such motors is low. Additionally, it is difficult to adjust and release the surplus energy produced by the motor.

The speed variation of a commutator motor is obtained by change of the rotary magnetic field with appropriate frequency produced by changing the position of the winding led to the AC power supply. The respons of this type of motor is somewhat erratic because of the appearance of sparks in the commutator, and the construction of the motor becomes complicated in order to eliminate such sparks.

OBJECTS OF THE INVENTION

The principal object of the present invention is to provide a method for infinite speed variation of an AC motor by means of a slip-converter and a new infinitely variable speed AC motor according to this method that solves or ameliorates the foregoing problems.

SUMMARY OF THE INVENTION

In the method of the present invention, with a combination of at least two asynchronous motors, a slip motor, a converter motor comprising two rotors, etc., not only a rotor of a converter motor is mechanically turned by a rotor of a slip motor, but also a first rotary magnetic field in the converter motor is produced by an induced current in the windings of the rotor of the slip motor. A second rotary magnetic field having an appropriate frequency for the other rotor of the converter motor is produced by composition of the rotary frequency of the first rotary magnetic field and the mechanical rotary frequency of the rotor of the converter motor, so that frequency-converting and infinite speed variation of the motor can be carried out, or an AC potential having a required frequency induced by the other rotor of the converter motor is used for turning an auxiliary motor, or feedback to an electric network.

The "motor Type I of the present invention" means the combination in which the second rotary magnetic field is used to perform frequency-converting and speed variation of the motor or the AC potential having the required frequency induced by the other rotor of the converter motor is used for turning an auxiliary motor. The "motor Type II of the present invention" means the combination in which the AC potential having the required frequency induced by the other rotor of the converter motor is used for feedback to an electricl network.

DETAILED DESCRIPTION OF THE PRESENT PEFERRED EMBODIMENTS

Two type motors according to the method of the present invention, which illustrates specific embodiments of the present invention as nonlimitative examples, will be described hereinafter with particular reference to the accompanying drawings.

The First Embodiment

Figure 1:
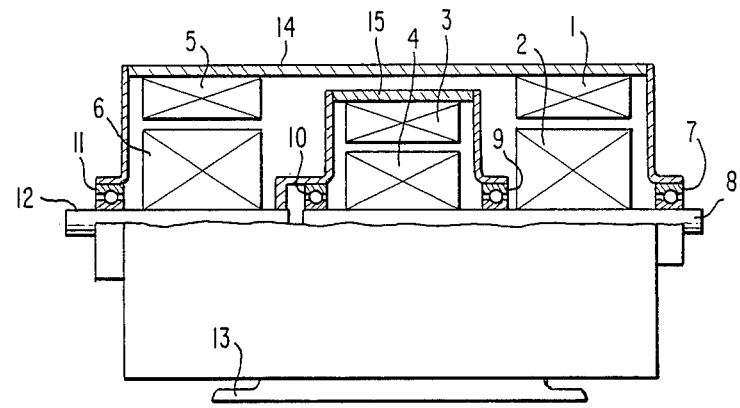
FIG. 1 illustrates diagrammatically the configuration of a first embodiment of the motor Type I of the present invention.

The configuration of a first embodiment of the motor Type I of the present invention is illustrated in FIG. 1. A stator 1 and a stator 5, each of which comprise a core and windings, are mounted in a housing 14 of a motor mounted on a base 13. A rotor 2 and an interior rotor 4, each of which comprise a core and windings, are mounted on a shaft 8. An external rotor 3 comprising a core and windings is rigidly coupled with a shaft 12 by a support 15. The support 15 is journaled on bearings 9, 10 mounted on the shaft 8. The shafts 8 and 12 are journaled in the housing 14 by bearing 7, 11, respectively. A rotor 6 is mounted on the shaft 12. The shafts 8 and 12 can be independently rotated at individual speeds. The stator 1 and the rotor 2 mounted on the shaft 8 constitute a slip motor. The external rotor 3 and the interior rotor 4 mounted on the shaft 8 constitute a converter motor. The stator 5 and the rotor 6 mounted on the shaft 12 constitute an auxiliary motor.

An AC power supply is connected to the windings of the stator 1 of the slip motor. The windings of the rotor 2 of the slip motor are connected to the windings of the interior rotor 4 of the converter motor along the shaft 8 through the bearing 9. While the rotor 2 of the slip motor is excited by a rotary magnetic field produced by the stator 1 to mechanically turn the interior rotor 4, an induced AC potential is provided from the windings of the rotor 2 to the windings of the interior rotor 4. The terminals of the windings of the rotor 2 and the interior rotor 4 are connected in such a way that the rotary direction of the rotary magnetic field produced by the exciting current in the windings of the interior rotor 4 (which is an induced current in windings of the rotor 2) is opposite to the direction of mechanical rotation of the shaft 8.

The windings of the external rotor 3 of the converter motor are connected to the windings of the rotor 6 of the auxiliary motor. The external rotor 3 of the converter motor, the windings of which also power the windings of the rotor 6, are excited by a rotary magnetic field produced by the interior rotor 4 to mechanically turn the shaft 12. The terminals of the windings of the rotor 6 and the external rotor 3 are connected in such a way that the rotary direction of the rotary magnetic field produced by the exciting current in the windings of the rotor 6 (which is an induced current in the windings of the external rotary 3) is opposite to the direction of mechanical rotation of the shaft 12.

The stator 5 of the auxiliary motor may be a squirrel-cage or a winding type configuration. The electromagnetic torque in the same direction as the mechanical rotation of the shaft 12 is produced by the auxiliary motor.

The motor of the present invention can operate normally if the condition of the following equation is met:

$$\frac{\left[-\frac{\left(\frac{60 f_0}{P_1} - n_1\right) \cdot P_1}{P_1} + n_1 - n_2\right] \cdot P_2/2}{P_3/2} - n_2 = \Delta n,$$

that is, $$n = \frac{120 f_0 + (P_2 + P_3) \cdot n_2 + P_3 \cdot \Delta n}{P_1 + P_2},$$

wherein $f_0$ is the frequency of the input potential of the motor of the present invention; $P_1$, $P_2$, and $P_3$ are the number of poles of the slip motor, the converter motor, and the auxiliary motor, respectively; $\Delta n$ is the slip amount of the auxiliary motor which is required in its normal operation; $n \geq 0$; and $n_1$ and $n_2$ are the rotary speeds of the shaft 8 and the shaft 12, respectively.

With arbitrarily given $n_2$ and $\Delta n$ in the permitted variable speed range of the motor Type I, the above equation can be met provided that the input potential of the motor is appropriately adjusted. If $n_2=0$ and $\Delta n=0$ are demanded, it is only required that:

$$n_1 = \frac{120 f_0}{P_1 + P_2}$$

making $$n_{10} = \frac{120 f_0}{P_1 + P_2}.$$

The state in which the motor is at $n_1 = n_{10}$ is called "the preparatory state" of the motor Type I. The process in which $n_1$ is increased from 0 to $n_{10}$ is called "the preparatory process." When the motor is in the preparatory state, the speed of the shaft 12 with any load thereon is at 0.

After the time to start the motor at $n_1=0$, $n_2=0$, the input potential of the motor is increased from 0. So long as $n_1 < n_{10}$ (that is, the motor is in the preparatory process), the electromagnetic torque to the shaft 8 produced by the converter motor and the slip motor are the same in direction. In this phase of operation, the electromagnetic torque urges $n_1$ to increase rapidly until $n_1 = n_{10}$—that is, the motor comes into the preparatory state. No matter what the load on the shaft 12 is, the shaft 8 is always started at no load. Therefore, the starting of the motor is rapid and there is no overcurrent in the windings. At the same time, the opposite impulse torque on the shaft 12 is very small and has little influence on the shaft 12. A braking torque can be provided to the shaft 12 in the preparatory process if necessary. As the input potential of the motor is increased, $n_1$ becomes more than $n_{10}$, and an infinite speed variation can be carried out by means of successive adjustments of the speed of the shaft 12.

As $n_1$ is approaching the synchronous speed of the slip motor, $n_2$ approaches its limiting value:

$$N_{max} \approx 120 \, P_1 \cdot f / P_1(P_2 + P_2).$$

Accordingly, the variable speed range of the motor Type I of the present invention is wide, since $0 \leq n \leq n_{max}$.

An advantage of the motor of the present invention different from the conventional converter motor is that the lower the output speed of the motor is, the higher the frequency of input potential of the converter motor thereof is.

The shaft 12, the output torque on which is a composite of the torque of the converter motor and the auxiliary motor, serves as the load shaft of the motor Type I of the present invention. Because the surplus energy produced by the slip motor can be transformed into mechanical energy, and because the lower the speed of the shaft 12 is, in general, the bigger the torque of the auxiliary motor is, the performance of the motor Type I of the present invention is better at lower speeds.

The rotary direction of the shaft 8 and the shaft 12 can be changed by means of change in phase order of the input potential of the motor.

The Second Embodiment

Figure 2:
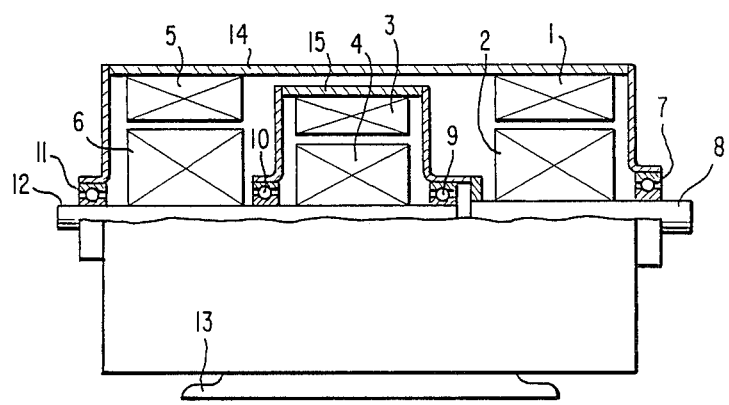
FIG. 2 illustrates diagrammatically the configuration of a second embodiment of the motor Type I of the present invention.

A second embodiment of the motor Type I of the present invention is shown in FIG. 2. In this embodiment, the external rotor 3 of the converter motor is rigidly coupled with the shaft 8 of the slip motor. The support 15 is journaled on the bearings 9, 10 as before, but the bearings 9, 10 are mounted on the shaft 12 instead of on the shaft 8. Also, the interior rotor 4 is mounted on the shaft 12 instead of on the shaft 8. The external rotor 3 and the interior rotor 4 constitute a converter motor. The windings of the rotor 2 of the slip motor are connected to the windings of the external rotor 3 of the converter motor. While the rotor 2 of the slip motor is excited by a rotary magnetic field produced by the stator 1 to mechanically turn the external rotor 3, an induced AC potential is provided from the windings of the rotor 2 to the windings of the external rotor 3. The terminals of the windings of the rotor 2 and the external rotor 3 are connected in such a way that the rotary direction of the rotary magnetic field produced by the exciting current in the windings of the external rotor 3 (which is an induced current in the windings of the rotor 2) is opposite to the direction of the mechanical rotation of the shaft 12.

The windings of the interior rotor 4 of the converter motor are connected to the windings of the rotor 6 of the auxiliary motor along the shaft 12 through the bearing 10. The interior rotor 4 of the converter motor, the windings of which also power the windings of the rotor 6, are excited by a rotary magnetic field produced by the external rotor 3 to mechanically turn the shaft 12. The terminals of the windings of the rotor 6 and the interior rotor 4 are connected in such a way that the rotary direction of the rotary magnetic field produced by the exciting current in the windings of the rotor 6 (which is an induced current in the windings of the interior rotor 4) is opposite to the direction of the mechanical rotation of the shaft 12.

As another embodiment of the present invention, the auxiliary motor in the first and second embodiments can be eliminated, and the windings of the rotor of the converter motor connected to the windings of the rotor 6 of the auxiliary motor shorted, or formed into a squirrel-cage type configuration.

The motor of first type comprises two motors, a winding-rotor motor which has no electric brushes and slip ring and which is used as a slip motor and a squirrel cage motor which is used as a converter motor. Two possible configurations of this embodiment are possible based upon the location each other of the two rotors of the converter motor, one of which is mounted on the shaft of the rotor of the slip motor and the other is mounted on the load shaft. In one subembodiment of the first type, a motor which used as a slip motor is the winding-rotor motor without an electric brush and a slip ring and a motor which used as a converter motor is the motor having an inner winding-rotor and a squirrel cage type external rotor. The inner rotor of the converter motor is rigidly coupled to the rotor of the slip motor. The inner rotor of the converter motor and the external rotor of the converter motor can independently rotate at different rates of speed. The windings of the rotor of the slip motor are connected to the windings of the inner rotor of the converter motor. The shaft of the external rotor of the converter motor serves as a load shaft.

When a three phase (or single phase) AC power supply is connected to the windings of the stator of the slip motor, a rotary magnetic field is produced. When the rotor of the slip motor is excited by a rotary magnetic field produced by the stator to mechanically turns the inner rotor of the converter motor and an induced AC potential is produced in the windings of the slip motor's rotor and an induced current is formed in a loop constituted by the windings of this rotor and the windings of the inner rotor of the converter motor such that another rotary magnetic field is produced in the converter motor. The terminals of the windings of the rotor and the inner rotor are connected in such a manner so that the rotary direction of the rotary magnetic field in the converter motor produced by the induced current is opposite to the direction of the mechanical rotation of the inner rotor. Consequently when the rotor of the slip motor turns the inner rotor, the rotary speed of the resulting rotary magnetic field produced in the converter motor (i.e. the synchronous rotary speed of the converter motor) is the algebraic sum of the rotary speed of the rotary magnetic field (relative to the inner rotor) and the mechanical rotor speed of the inner rotor proper. Consequently due to the opposite direction of these two rotary motions, the synchronous rotary speed is the difference between the absolute values of the two rotary speeds wherein the rotary direction of the rotor of the slip motor is assumed as positive. The process of the rotary speed of the rotor of the slip motor increasing from the zero point to $n_{10}$ is referred to as a transient process of the motor, as will be described below. The range of the rotary speed of the rotor of the slip motor ranging from $n_{10}$ to the synchronous rotary speed of the slip motor being referred to as the operation range and the state of the motor in which the rotary speed of the rotor of the slip motor is at $n_{10}$ being referred to as a preparatory state of the rotor, as well be set forth below. When the motor is in this preparatory state its output rotary speed is zero irrespective of the load on the output shaft.

When the motor is initially started $n_1=0$ and $n_2=0$ wherein $n_1$ is defined as the rotary speed of the inner rotor of the converter motor and $n_2$ is the rotary speed of the external rotor. As the input voltage of the motor increases from 0, $n_1$ consequently increases. When $n_1 < n_{10}$ (i.e. the motor is operating in the transient phase) due to the same direction of electromagnetic torque on the rotor of the slip motor produced by both the slip and converter motor, the rotary speed of the rotor of the slip motor is rapidly increased until the motor passes through the transient phase and is in the preparatory phase. During this period there is no opposite torque upon the rotor of the slip motor, except friction torque therefore only a small electromagnetic torque is needed to provide speed to the rotor of the slip motor and the input voltage of the motor is consequently low preventing any overcurrent occurring at the starting up of the motor.

When $n_1$ is greater than $n_{10}$ (i.e. the motor is operating within the operating range) there is positive torque upon the external rotor because of the positive synchronous rotary speed of the converter motor. As $n_1$ increases, the synchronous rotor speed of the converter motor increases continuously, such that the infinite speed variation of the motor of this invention can be effected. There is no need to start up the motor repeatedly as long as $n_1$ is greater than or equal to $n_{10}$ after the starting up unless a reverse rotation of the motor is required. Consequently in the operation range of the motor, the electromagnetic torque supplied by the converter motor serves as a load torque for the slip motor. While the slip motor operates at a high slip ratio and transmits its mechanical energy to the converter motor by means of mechanically turning the inner rotor, the windings of the rotor of the slip motor, which serve as a power supply for the converter motor, transmit the slip energy to the converter motor and therefore this energy can be utilized. An infinite speed variation of this motor can be carried out be adjusting its input voltage to control the rotary speed $n_1$ of the slip motor.

In another embodiment of the first type, the motor which used as a converter motor is the motor having a squirrel cage type inner rotor and an external winding-rotor. The external rotor of the converter motor is rigidly coupled to the rotor of the slip motor. The shaft of the inner rotor of the converter motor serves as a load shaft. As an example, a type NED-501 motor with two poles designed to be operated at 57 volts is used as the slip motor, and a type 5638 motor with eight poles designed to be operated at 27 volts is used as the converter motor. The shaft 12 still serves as the load shaft. In this case, the total efficiency of the motor can be increased further, the construction simplified, and the cost lowered.

The motor Type I of the present invention without an electric brush and a commutation device is simple and sturdy in construction, capable of reversing rotation, and has a wide variable speed range from 0. The motor is easy to start with no overcurrent and can be started frequently. It operates smoothly without any spark. The motor has high reliability, is easily maintained and repaired, and has a high overload capacity. Because the lower the speed of the shaft 12 is, the bigger the output torque is, the performance of the motor is better at the lower speeds.

The motor Type I is suitable for use for electric powered towing, in lifting equipment, and in metallurgical, mining, and other fields where motors with infinite speed variation are used. It can also be used for explosion-proof equipment with infinite speed variation.

In high power operation, the advantages of this type motor are still better.

The Third Embodiment

Figure 3:
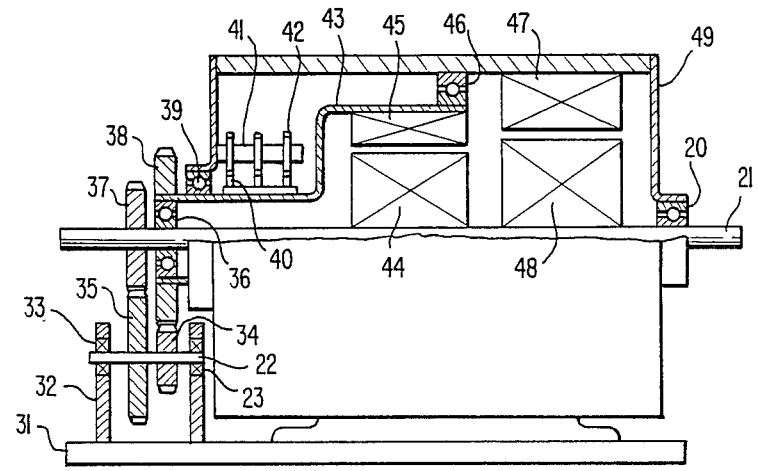
FIG. 3 illustrates diagrammatically the configuration of the motor Type II of the present invention.

The configuration of motor Type II of the present invention is illustrated in FIG. 3. A stator 47 comprising a core and windings is mounted in a housing 49 mounted on a base 31. A rotor 48 and an interior rotor 44, each of which comprises a core and windings, are mounted on a shaft 21. An external rotor 45 comprising a core and windings is mounted on a support 43 journaled in the housing 49 by bearings 39, 46. The shaft 21 is connected to the support 43 by a bearing 36 and to the housing 49 by a bearing 20.

A gear 37 is mounted on the shaft 21. Gears 34, 35 are mounted on a shaft 22. The shaft 22 is journaled in bearings 23, 33 in shaft supports 32, and the shaft supports 32 are mounted on the base 31. A gear 38 is mounted on the support 43. The gears 37, 38 mesh with the gears 35, 34, respectively, so that the external rotor 45 rotates in the same direction as the shaft 21 at a static speed ratio. The gears 34, 35, 37, and 38 constitute the gear system of the motor. The rotor 48 mounted on the shaft 21, the interior rotor 44, the external rotor 45, the support 43, and the gear system constitute the rotor system of the motor.

An electric brush 42 is mounted inside the housing 49 on a support 41. A slip ring 40 is fixed on the support 43. The stator 47 and the rotor 48 mounted on the shaft 21 constitute a slip motor. The external rotor 45 and the interior rotor 44 mounted on the shaft 21 constitute a converter motor.

An AC power supply is connected to the windings of the stator 47 of the slip motor. The windings of the rotor 48 of the slip motor are connected to the windings of the interior rotor 44 of the converter motor. While the rotor 48 of the slip motor is excited by a rotary magnetic field produced by the stator 47 to mechanically turn the interior rotor 44, the external rotor 48 rotates in the direction as the rotor 48 at a static speed ratio provided by the gear system. An AC potential is provided from the windings of the rotor 48 of the slip motor to the windings of the interior rotor 44 of the converter motor. The terminals of the windings of the rotor 48 and the interior rotor 44 are connected in such a way that the rotary direction of the rotary magnetic field produced by the exciting current and the windings of the interior rotor 44 of the converter motor (which is an induced current in the windings of the rotor 48) is the same as the direction of mechanical rotation of the shaft 21. The induced potential in the windings of the external rotor 45 is led out by the slip ring 40 and the electric brush 42.

In order to make the frequency of the output potential of the motor Type II of the present invention be the same as the that of the input potential, the following equation must be met:

$$\left[\frac{\left(\frac{60 f_0}{P_1} - n_1\right) \cdot P_1}{P_2/2} + n_2 - n_1\right] \cdot P_2/2 = 60 f_0,$$

that is, $n_1/n_2 = P_2/(P_2 - P_1)$.

wherein $P_1$ and $P_2$ are the number of poles of the slip motor and the converter motor, respectively; and $n_1$ and $n_2$ are the rotary speeds of the shaft 21 and the external rotor 45, respectively.

So long as the number $P_2$ is more than the number $P_1$, and the condition of the equation $n_1/n_2 = P_2/(P_2 - P_1)$ is met by the gear system, it is ensured that the output potential of the motor has the same frequency as the input potential thereof at any speed of the shaft 21, and the surplus energy produced by the slip motor at that speed can be fed back to an electric network.

When the number $P_2$ is less than the number $P_1$, the gear system is designed so that the rotary direction of the interior rotor 44 and the external rotor 45 of the converter motor are opposite to each other and that the condition of the equation $n_1/n_2 = P_2/(P_1 - P_2)$ is met. As an example, a gear which meshes with the gear 35 as well as the gear 37 can be added between the gear 35 and the gear 37. The configuration and windings wiring are the same as that in the third embodiment except as above-mentioned.

The electromagnetic torque on the shaft 21 produced by the converter motor, which has a direction opposite to the direction of mechanical rotation of the shaft 21, can be transformed into interior force in the rotor system of the motor by the rotor system. As a result, the output torque of the shaft 21 is not decreased.

The infinite speed variation of the motor Type II of the present invention can be carried out by means of a adjustment of the amount of feedback of the motor, or the input potential of the motor, or a combination of both.

The output torque of the motor is that of the slip motor.

The motor Type II of the present invention is also small, simple and sturdy in construction, capable of reversing rotation, and with constant output torque. It is inexpensive and suitable for speed variation of blowers, fans, and pumps.

While the principles of the present invention have been described above in connection with specific embodiments and particular modifications thereof, it is to be clearly understood that this description is made only by way of example and not as a limitation on the scope of the invention.

What is claimed as new and desired to be secured by Letters Patent of the United States is:

1. A variable speed AC motor comprising:
   first converter motor having external rotor and internal rotor wherein rotors have windings and second converter motor;
   a slip motor having a shaft coupled to said external roof of said first converter motor;
   a rotatable shaft traversing the center of said converter motors;
   an internal rotor in said slip motor having windings;
   means for coupling the windings of said internal rotor of said slip motor to the windings of the external rotor of said first converter motor such that upon the internal rotor being subjected to a rotary magnetic field an AC potential is provided to the windings of said external rotor of said first converter motor which produces in said windings a rotary magnetic field that is opposite to the direction of the rotation of said shaft;
   means for coupling the windings of the interior rotor of said first converter motor to the windings of the interior rotor of said second converter motor such that an induced current in the windings of the interior rotor of said first converter motor produces in said second converter motor a rotary magnetic field which is opposite to the rotation of the shaft.

* * * * *